United States Patent
Ellis et al.

(10) Patent No.: US 7,167,863 B2
(45) Date of Patent: Jan. 23, 2007

(54) SYSTEM AND METHOD FOR BUILDING A DISTRIBUTED INTERNET APPLICATION

(75) Inventors: Danny Dee Ellis, La Vernia, TX (US); Jeffrey William Gallagher, San Antonio, TX (US); Anantrachai Kaewlium, San Antonio, TX (US); Matthew George Westerman, San Antonio, TX (US); Richard Paul Proft, San Antonio, TX (US); Craig Mason Bush, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 495 days.

(21) Appl. No.: 10/629,464

(22) Filed: Jul. 29, 2003

(65) Prior Publication Data

US 2005/0033717 A1    Feb. 10, 2005

Related U.S. Application Data

(60) Provisional application No. 60/399,871, filed on Jul. 30, 2002.

(51) Int. Cl.
G06F 17/30 (2006.01)
G06F 17/50 (2006.01)

(52) U.S. Cl. ............................................. 707/10; 705/7
(58) Field of Classification Search ............... 707/1–10, 707/101, 102; 705/7, 517; 709/203
See application file for complete search history.

(56) References Cited

U.S. PATENT DOCUMENTS

| | | | |
|---|---|---|---|
| 5,899,990 A | 5/1999 | Maritzen et al. | |
| 5,974,441 A | 10/1999 | Rogers et al. | |
| 5,987,611 A | 11/1999 | Freund | |
| 5,999,941 A | 12/1999 | Andersen | |
| 6,029,201 A | 2/2000 | Neill | |
| 6,044,403 A | 3/2000 | Gerszberg et al. | |
| 6,128,619 A | 10/2000 | Fogarasi et al. | |
| 6,330,594 B1 * | 12/2001 | Swart | 709/219 |
| 6,363,398 B1 | 3/2002 | Andersen | |
| 6,463,578 B1 | 10/2002 | Johnson | |
| 6,574,635 B2 * | 6/2003 | Stauber et al. | 707/103 R |
| 6,606,708 B1 | 8/2003 | Devine et al. | |
| 6,816,882 B1 * | 11/2004 | Conner et al. | 709/203 |
| 6,968,535 B2 * | 11/2005 | Stelting et al. | 717/104 |
| 6,990,532 B2 * | 1/2006 | Day et al. | 709/245 |
| 2002/0022982 A1 * | 2/2002 | Cooperstone et al. | 705/7 |
| 2002/0035584 A1 * | 3/2002 | Scheier et al. | 707/517 |
| 2002/0161667 A1 * | 10/2002 | Felkey et al. | 705/26 |
| 2003/0023676 A1 * | 1/2003 | Slater | 709/203 |

* cited by examiner

Primary Examiner—Mohammed Ali
Assistant Examiner—Shew-Fen Lin
(74) Attorney, Agent, or Firm—Haynes and Boone, LLP

(57) ABSTRACT

A system for providing client services with the assistance of a single source includes a distributed Internet application (DIA) maintained by an assisting party. A computer system is provided for accessing the DIA by a user. The DIA includes a presentation tier, an integration tier and a business tier. An application server couples the integration tier and the presentation tier to determine task sequencing in the presentation tier. A plurality of business units of the assisting party are provided in the business tier, the business units being accessible through the integration tier.

3 Claims, 6 Drawing Sheets

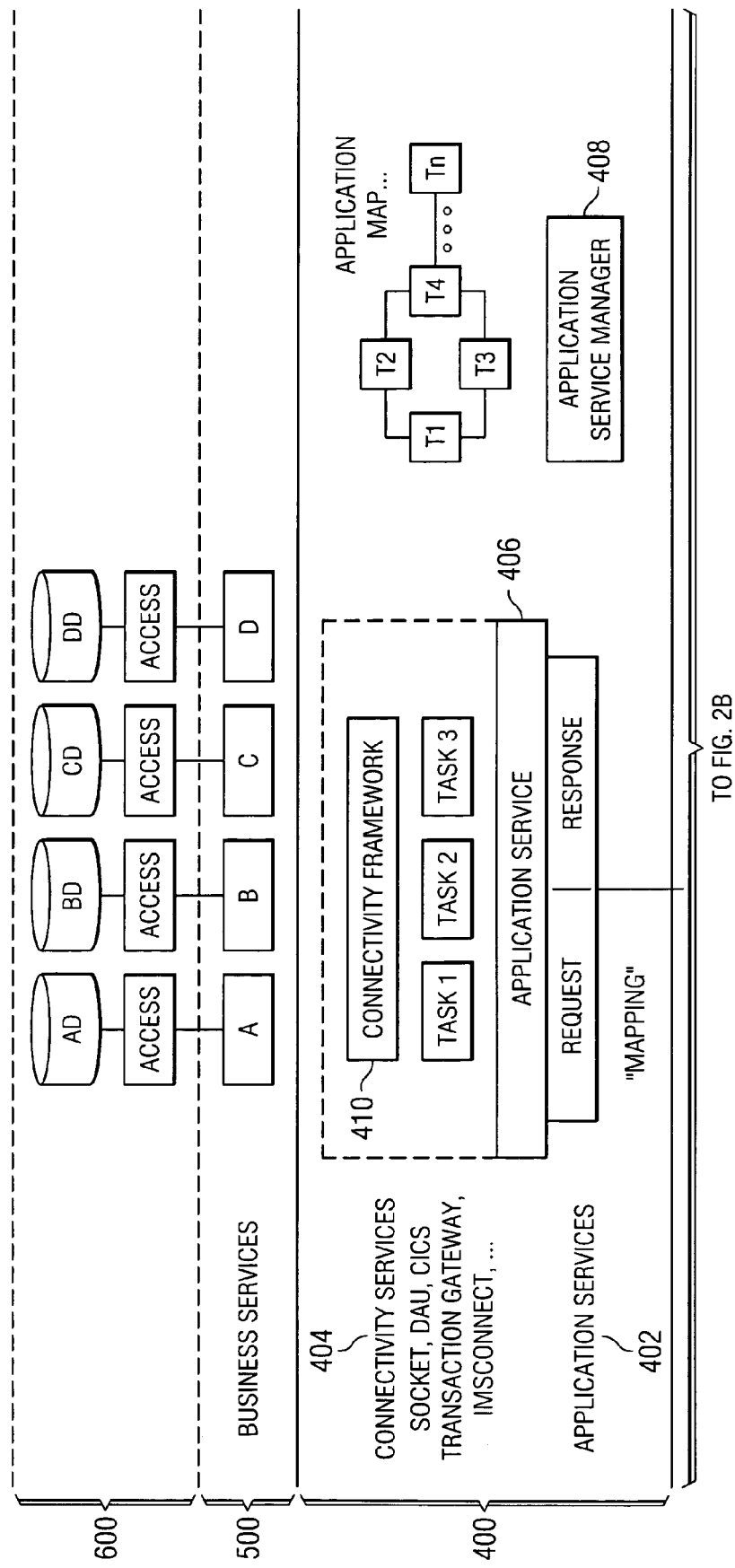

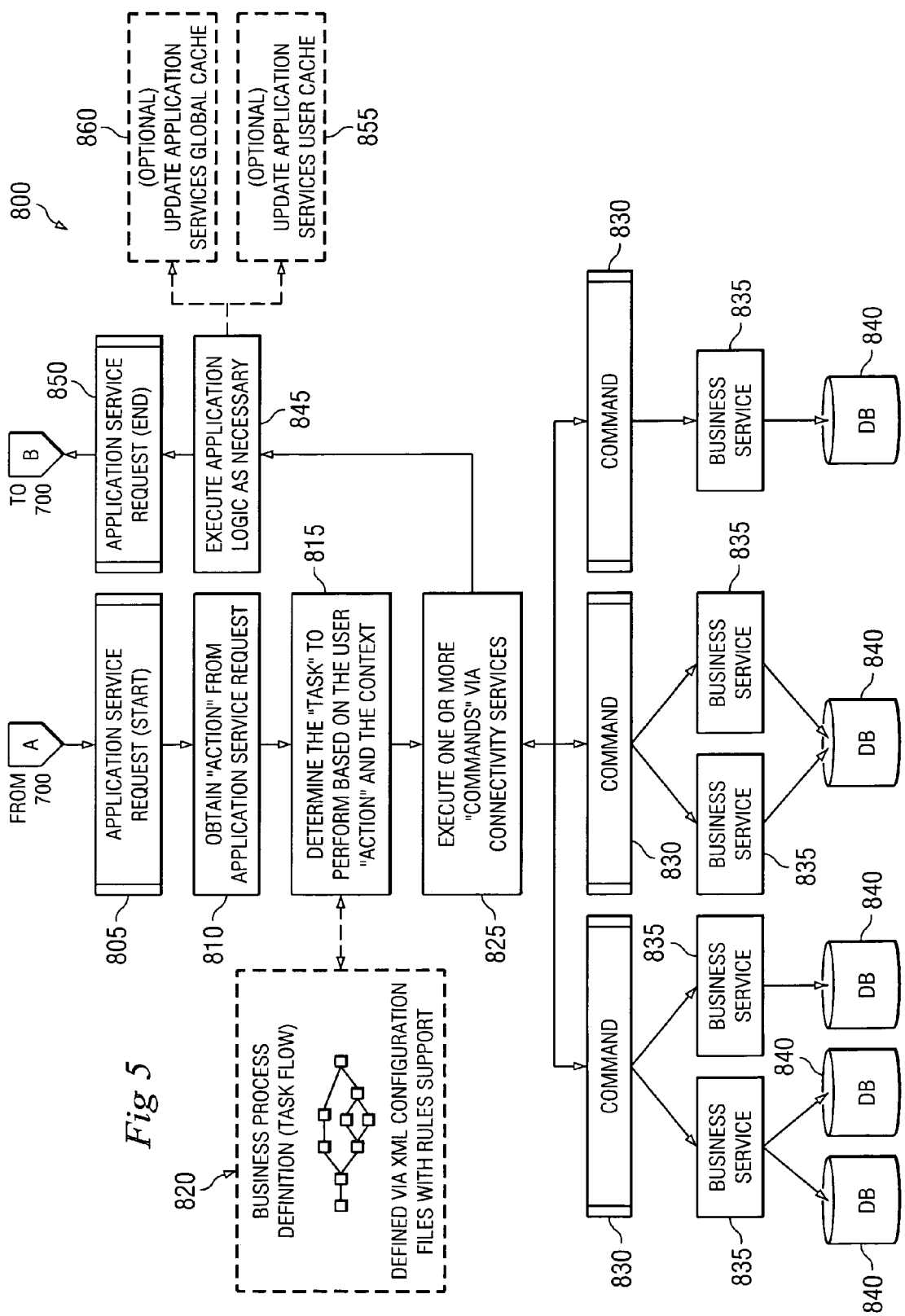

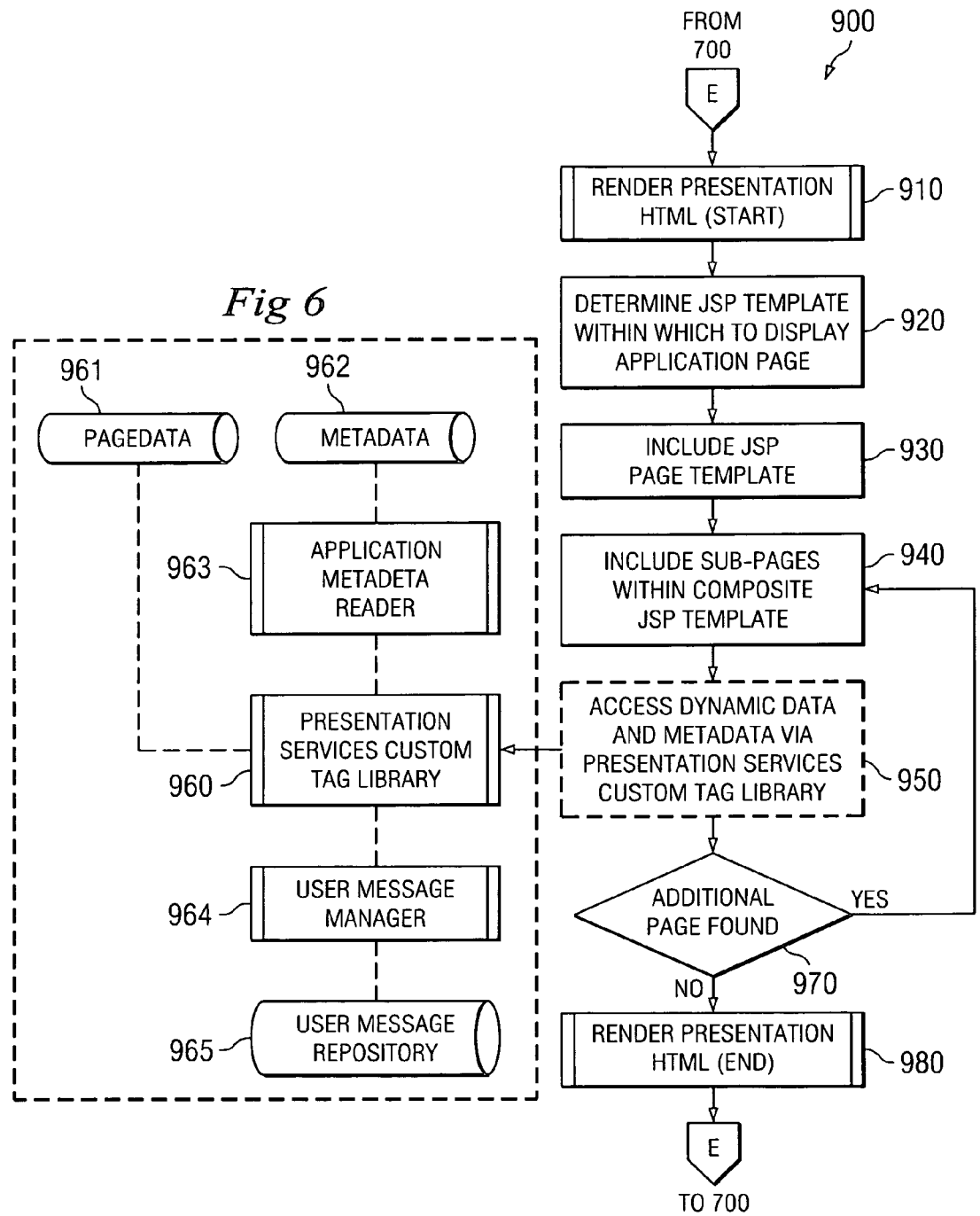

SYSTEM AND METHOD FOR BUILDING A DISTRIBUTED INTERNET APPLICATION

This application claims priority to U.S. Application Ser. No. 60/399,871 filed Jul. 30, 2002, entitled E-COMMERCE APPLICATION ARCHITECTURE, which is incorporated herein by reference in its entirety.

BACKGROUND

The disclosures herein relate generally to providing web based services and particularly to providing a variety of services linked to a distributed Internet application.

A problem in building Java-based web applications is that in order to build web pages, web developers need to know how to retrieve data from various objects, each of which contains its own unique data model and relationship to other objects. Each of these objects will have a different interface, and thus, the page developer must know how to interact with each object based on its specific interface.

It would be of benefit to avoid such problems and build a common model of page data as a basis for use in a multi-tiered E-commerce architecture. This model of page data can then enhance interaction between various tiers of the architecture.

SUMMARY

One embodiment, accordingly, provides a method of providing client services including providing a distributed Internet application linked to a presentation tier, an integration tier and a business tier. An application service is coupled to the presentation tier to determine task sequencing.

A principal advantage of this embodiment is that the E-commerce architecture is a tiered architecture implemented through a standard set of technical frameworks, each performing a well-defined set of functionality. These frameworks are designed to be extended at pre-defined points to create the specific functionality of each individual E-commerce application. These applications retain a standard flow of control as enforced by the frameworks and are delivered through a well-defined and repeatable process.

BRIEF DESCRIPTION OF THE DRAWINGS

FIG. 2A is a more detailed view illustrating an embodiment of the E-commerce architecture.

FIG. 5 is a flowchart illustrating an embodiment of another portion of a distributed Internet application.

FIG. 6 is a flowchart illustrating an embodiment of another portion of a distributed Internet application.

DETAILED DESCRIPTION

An E-commerce architecture is a process used by a provider for delivering applications to users on the Internet. An architecture that is process based defines components of the architecture and how they communicate.

Figure 1:
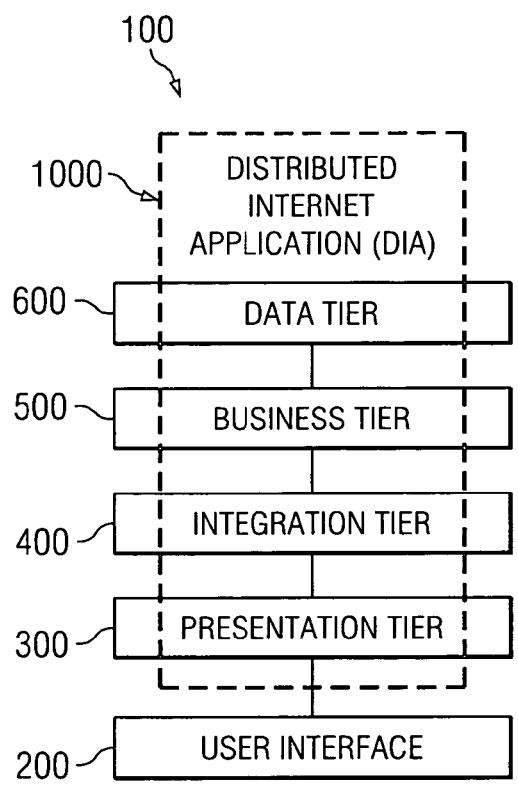
FIG. 1 is a diagrammatic view illustrating an embodiment of an E-commerce architecture.

A multi-tiered process based architecture is illustrated in FIG. 1 and includes an environment for electronic distributed applications (E-platform application) architecture 100 including a client or user interface 200, a presentation tier 300, an integration tier 400, a business tier 500 and a data tier 600. The multi-tiered process may include any required number of tiers, i.e. n-tiers. A distributed Internet application 1000 is a software application program implemented in an n-tier architecture, delivered using internet-based technologies, and accessible via one or more electronic delivery channels including PC-based web browsers, personal digital assistants (PDAs), web-enabled phones, voice response, and business to business (B2B) communications, as discussed below.

At the user interface 200, FIG. 2A, a user may use one of several communication channels including a computer used by an employee 202 or a computer used by a customer 204, a PDA device 206, a web enabled phone device 208, a business to business communication 210, or a telephone device 212. Through these devices, a communication is made to the architecture via a request to the presentation tier 300, FIG.2A. A user may be a member of the provider organization, a member service representative, a customer, a customer service representative, an agent or a vendor.

As indicated previously, the E-platform application architecture 100 is a tiered architecture with specific frameworks providing the pattern and high-level control flow for the behavior of applications on each tier. The following sections describe the three key frameworks: Presentation Services, Application Services, and Connectivity Services as well as describing the approach used for interacting with Business and Data Services.

The purpose of the presentation tier 300 in a layered architecture is to communicate with the business tier 500 and to render the user interface 200 for the application relative to the specific device that is executing the application. Its role is to render the application user interface 200 for the appropriate device and to provide for personalization of the application content as required based on the user. The presentation tier 300 is responsible for managing the user interaction, handling simple field syntax validations, and communicating the results of user interactions to the business tier 500 for further processing. It may also handle some very simple application flow and would be responsible for factoring the application flow into smaller chunks for devices that have limited user interface viewports such as PDAs 206, phones 208, 212 etc.

The presentation tier 300 is implemented by presentation services 302. The presentation services 302 framework provides the following capabilities:

A framework of cooperating classes that defines the overall structure of a web-based application, including flow of control, collaboration of objects and classes, and key responsibilities of each object and class.

User/Environment Profiles provide the ability for applications to store and retrieve attributes that allow them to customize the experience for individual users and groups of users. This includes personalization and customization.

A Browser Profile provides a solution for recognizing the client device for the current user and its capabilities.

Dynamic Section Generation provides the ability to automatically generate certain portions of dynamic content for a web page from a standard page data model and related metadata.

Help services offers the ability for applications to define and interface with multiple types of help content designed to aid the user in interacting with the system.

Field Edit Services provides support for automatic validation of input fields based on the fields data type, any associated metadata, and any application-provided edit criteria.

Message Display Services delivers a standard mechanism for defining and displaying application error messages to the end user.

A Custom Tag Library for page developers to access and render dynamic application content.

It should be noted that page data structure provides a generalized view of the data for a page supplemented by metadata (data that describes data) for things such as field labels, domain lists, edit rule definitions, help content and other extended attributes to enable generating the user interface for the page.

Figure 2B:
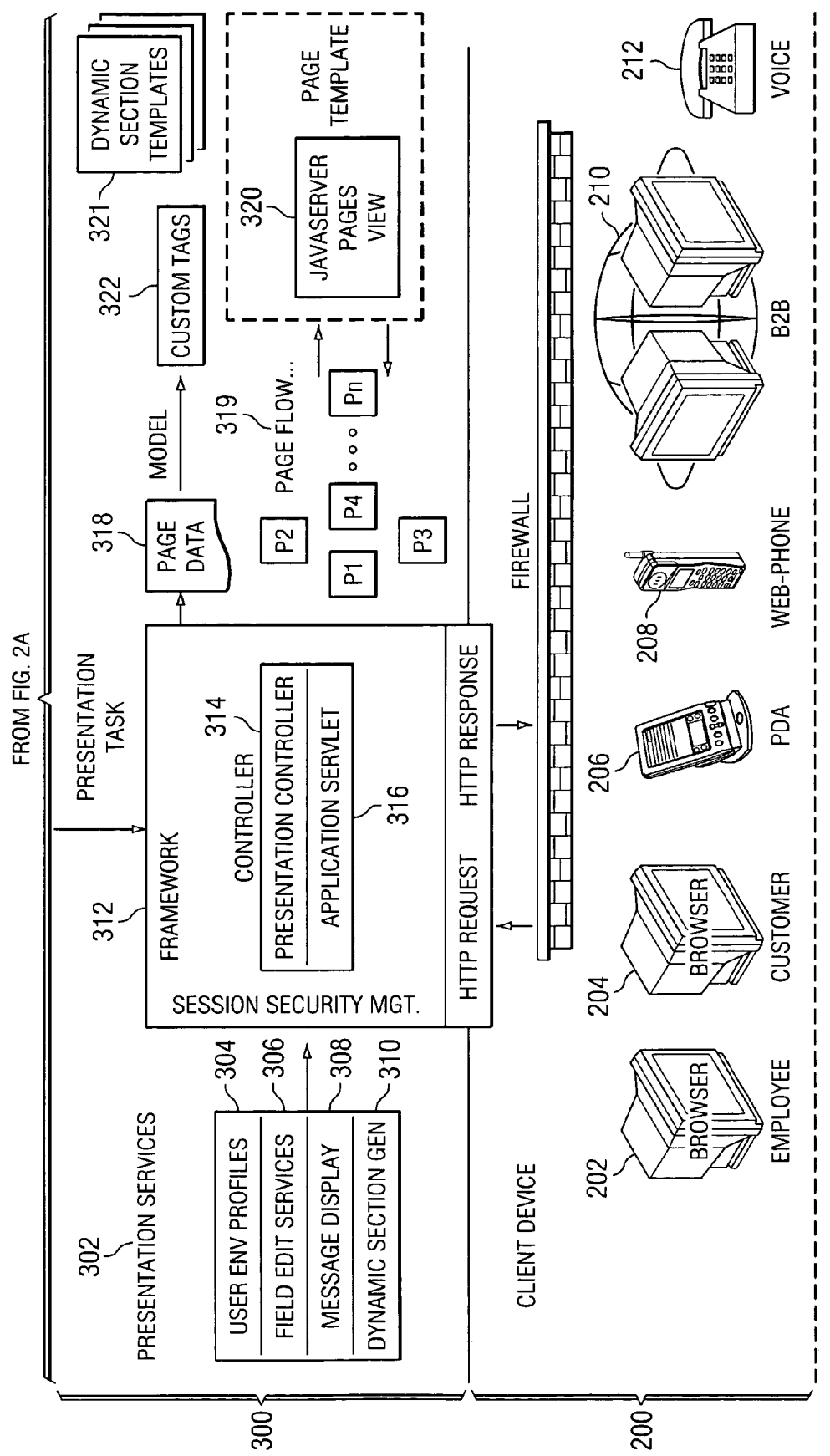
FIG. 2B is a more detailed view illustrating an embodiment of the E-commerce architecture.

The integration tier 400, FIG. 2B, of the architecture is made up of two key frameworks including application services 402 and connectivity services 404.

Application services 402 is the mediator between presentation services 302 and connectivity services 404. It manages the high-level flow of the application between major business functions or tasks, manages the application context, controls access to the appropriate business and data services needed by the application and manages the interaction with the presentation tier, providing it with various presentation tasks for the user to interact with.

Application services 402 also facilitates other application functions such as handling application errors and exceptions, and providing for caching application context as necessary.

Connectivity services 404 provides for cross-platform connectivity with various business and data services. The following capabilities are supported:

Provides high-performance access to enterprise business data and services across multiple platforms and protocols.

Provides patterns and examples for building enterprise connections.

Supports the ability to do both synchronous and asynchronous calls.

Provides a standard interface for application services to interact with.

The business tier 500, FIG. 2B, is responsible for encapsulating the interaction with the data tier 600 in order to translate data from back-end data sources into a set of objects and services that can be interacted with to perform specific business functions. The business tier 500 may include various business units including A, B, C and D. Each unit may be the provider of products and or services for the user. These business units may be for a single provider.

The primary purpose of the data tier 600, FIG. 2B, is to provide connectivity to back-end data sources and to provide the appropriate techniques for applications to access such data. It is responsible for insuring CRUD data access (create, read, update, delete functions) as well as mapping data from the business model to physical data stores. It also provides transactional support and error code to exception mapping. It also has a role in notifying applications when certain data has changed so that they can take appropriate action. The data tier 600 may include a data storage for each business unit, described above, as it relates to a specific client, accessible with an access code.

The presentation tier 300, FIG. 2A, includes a user environment profile portion 304, to indicate for example, whether a particular inquiry is in a test or a production environment. As a client interfaces with the architecture 100, the browser profile will know what device the client is using to interface with the architecture 100, for example, computer 204, PDA 206, etc.

A field edit services portion 306, of the presentation tier 300 controls how to validate input fields, such as a social security number or other identifying data. A message display portion 308, controls how input errors are shown, for example, highlighting and displaying errors on a display screen. Also, a dynamic section generator portion 310, generates a user interface from the page data.

A controller portion 312 controls the flow of functions of the presentation tier 300. The controller portion 312 includes a presentation controller 314 and an application servlet 316 which validates a session established with a user and confirms security issues. A page data model is updated at 318 if valid.

The presentation tier manages the set of pages to be displayed for a particular presentation task. It uses a page flow configuration 319 to determine if more pages are needed, e.g., web pages $P_1$, $P_2$, $P_3$, $P_4$ ... $P_n$, and schedules the appropriate page to be displayed. Pages are rendered through the use of Java Server pages at 320 with custom tags at 322 used to extract data from the page data model 318. The dynamic section generator 310 of presentation services 302 provides the ability to generate some or all of the hypertext markup language (HTML) code for a Java Server page 320 automatically based upon data and metadata found in page data model 318. This dynamically generated presentation can be tailored through the use of dynamic section templates 321. When the presentation task is completed and the page data model 318 has been updated, further communication is made with the application services 402 of the integration tier 400. Page flow 319 provides a rules-based page flow mechanism for controlling the flow of pages within a particular presentation task.

The integration tier 400 includes application services 402 and connectivity services 404. Application services 402 handles requests and responses at 406 as an interface with the presentation tier 300. Also, application services 402 interacts with the business tier 500 and data tier 600 via the connectivity services 404. This enhances updating and verifying data needed by the presentation tier 300 to build the page data model 318. An application service manager 408, controls the task order in which the data passes back to the presentation tier 300, e.g., tasks $T_1$, $T_2$, $T_3$, $T_4$ ... $T_n$.

A connectivity layer 410 provides a continuous translation of data between the various data sources of data tier 600, which may be in various formats, and the business format being used in the presentation tier 300. The connectivity layer 410 monitors a record of data in and out of the data tier 600.

The business unit A of the business tier 500 may, for example, provide banking services. Business unit B may, for example, provide credit card services. Business unit C may, for example, provide property and casualty insurance services. Business unit D may, for example, provide investment services. Each unit A, B, C and D is connected to, and has access to a respective database AD, BD, CD and DD, which includes data relating a user to a particular business unit.

Therefore, the presentation tier 300 communicates with business tier 500 and data tier 600 via the integration tier 400. The connectivity layer 410 provides data translation capability between the various data formats of databases AD, BD, CD and DD and the business format in the presentation tier 300.

Thus, the data required from a specific business unit, e.g. data CD from business unit C, is mapped into the page data model 318, and is updated and verified as task $T_1$, for example, until complete as determined by the application service manager 408. The application service manager 408 then presents the next task, e.g., $T_2$ until completed. The break out of major business tasks $T_1$–$T_n$ is continued until all tasks are completed, verified and error free.

Figure 3:
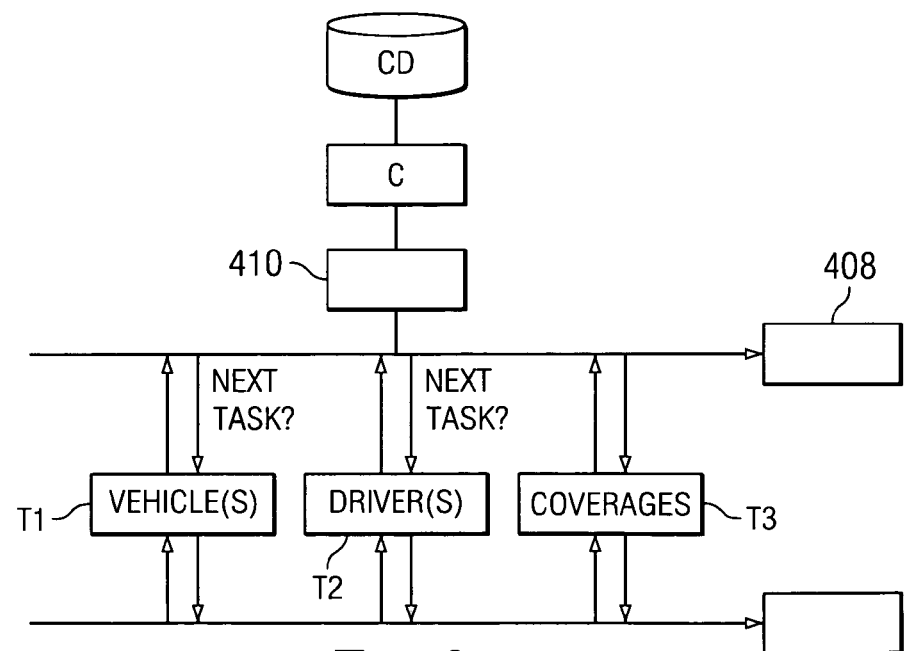
FIG. 3 is a more detailed view illustrating an embodiment of a specific operation of the E-commerce architecture.

In use for example, in FIG. 3, a user requests added insurance coverage for a new vehicle. The page data model 318 is built in presentation tier 300 as described above. The application service manager 408 determines the order of the tasks to be accomplished. For example, $T_1$ may require knowledge of the type of vehicle purchased. User data is acquired from database CD via connectivity layer 410 in building the page data model 318. Presentation task $T_1$ is requested by presentation tier 300 and is determined in order of request by the application services manager 408. When $T_1$ is completed, verified, and entered into the page data model 318, presentation task $T_2$, which may require user driver information is requested and processed through the database CD in an order determined by the application services manager 408 until $T_2$ is completed, verified and entered into the page data model 318. Presentation task $T_3$ may then require the type of coverage requested or needed. Thus, $T_3$ is processed through the CD database in an order determined by the applications services manager 408 until $T_3$ is completed, verified and entered into the page data model 318.

Figure 4:
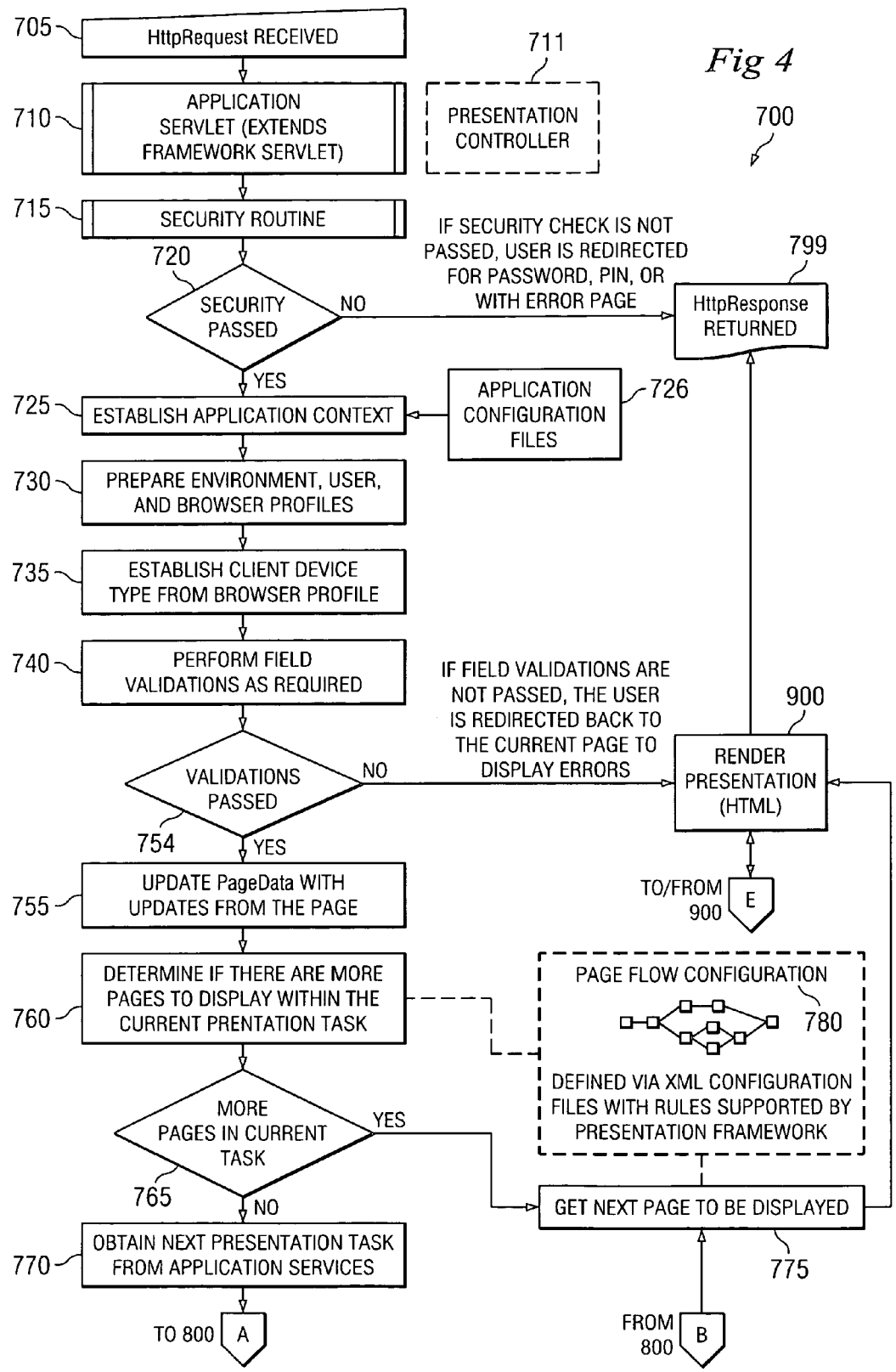
FIG. 4 is a flowchart illustrating an embodiment of a portion of a distributed Internet application.

Referring to flowchart 700, FIG. 4, an HttpRequest at step 705 is received from a client device. The request could be from an internal employee or an external customer via a web browser, from a personal digital assistant (PDA), a web enabled phone, etc.

An application servlet at step 710 receives the request. This application servlet collaborates with the Presentation Controller at step 711 as the controller (driver) for the application. It inherits from and extends the functionality provide by a servlet super-class provided by the Presentation Services framework of the E-Platform architecture.

The servlet super-class is responsible for implementing application security. It does so by delegating to a security module at step 715. This security module at step 715 authenticates the current user. If security checks are not passed at step 720 (Security passed=No), the user is automatically redirected to a screen to enter their user ID and password or a personal identification number (PIN) (depending on the requirements of the application). Once the user has been authenticated appropriately at step 720 (Security passed=Yes), the application is allowed to proceed.

Once the user has been authenticated by the framework and it has been determined that the user has authority to execute the application, the framework establishes the appropriate application context for the application at step 725. It does so by first checking to see if the request is for a new application or if the request is for a subsequent page of an application currently in progress. If the request is for a new application, the framework performs certain initialization activities for the application including setting up a new application context area at step 725 for the application in session. It also reads in various configuration files at step 726 for the application. If the request is for a subsequent page of an application, the framework connects to the existing application context at step 725.

The framework then prepares the appropriate references to Environment, User and Browser profiles at step 730 for use by the application.

Next, the framework uses information from the Browser Profile to determine the client device that is accessing the application at step 735. This information is used to determine the appropriate user interface to render.

If the request includes Form input data, the framework performs any front-line field edit checks at step 740 that the application has defined. These checks include mandatory field checks, data type checks, domain list validations, etc. If any checks fail at step 754 (Validations Passed=No), the previous page is redisplayed at flowchart 900 (discussed below) to the user with appropriate error messages inserted by the framework. Individual applications may extend or override these standard edit checks as necessary.

Once all validation checks have been passed at step 754 (Validations Passed=Yes), the PageData model that holds the data for the Presentation Tier pages is updated at step 755. The Presentation Services framework then determines if there are additional pages to be displayed within the current presentation task at step 760, to do so, it leverages the Page Flow Configuration 780. If more pages exist in the current Presentation Task 765 (More Pages in current Task=Yes), the framework determines the appropriate page to be displayed next 775. The framework then renders the presentation for the page 900.

If there are no additional pages to be displayed within the current presentation task at step 765 (More Pages in current Task=Yes), the application obtains the next Presentation Task from Application Services at step 770. It does so by interacting with flowchart 800 by invoking a specific Application Service at step 805. It passes any data collected within the current presentation task to the appropriate Application Service. The Application Service obtains the "action" from the data in the Application Service Request at step 810. For the case of a brand new application request, a factory class is called to retrieve an instance of an appropriate Application Service instance to interact with.

Application Services takes the data from the presentation tier and determines the next business task to be performed at step 815 and creates an instance of the task. To do so, it leverages an externalized Business Process Definition at step 820 for the application. The task then determines the data it needs to execute and invokes one or more commands at step 825 via Connectivity Services. A command can then execute a Business Service at step 835 to update an application database at step 840, or it may execute a Business Service at step 835 to obtain additional data needed from an application database at step 840.

Application Services then executes any application logic that has been defined at step 845. Optionally, it may also update the Application Services Global Cache at step 860 or the Application Services User Cache at step 855.

The data that is then returned to flowchart 700 via the Application Services Response at step 850 and populated into the PageData structure.

Once the PageData structure has been populated, the Presentation Tier flowchart 700 determines the next page to be displayed at step 775. Once the page to display has been determined, the presentation is rendered at flowchart 900.

The Render Presentation sub-process begins at step 910. The first step in this sub-process is to determine the page template within which to display the application page at step 920 and to actually include the page template at step 930.

Sub-pages are then included within the composite Java Server Pages (JSP) page template at step 940. These pages are then rendered by accessing dynamic application data and metadata through the proprietary Presentation Services custom tag library 950.

The Presentation Services Custom Tag Library at step 960 accesses dynamic application data from PageData at step 961 and application Metadata at step 962 through the Application Metadata Reader at step 963. These custom tags also provide the ability for pages to do iterations over collections of fields, execute conditional logic, etc. within pages. These tags allow pages to be defined in an explicit fashion via static JSP page layouts as well as providing the ability to dynamically render pages from the PageData model at step 961 in such a way that new fields and data elements can be dynamically introduced on the backend without having to change the JSP pages or the presentation tier. Any messages to be displayed to the user are accessed from the User Message Repository at step 965 through the User Message Manager at step 964.

If additional sub-pages are to be included at step 970 (Additional Page Found=Yes), then steps beginning at step 940 above are executed again for the additional sub-page until all pages have been completed. Once all sub-pages have been processed at step 970 (Additional Page Found=No), the render presentation sub-process is complete at step 980 and the HttpResponse is returned to the requester at step 799 (see flowchart 700).

One of the advantages of JavaServer Pages is that they provide the ability to attain a strict separation between presentation—the way data is displayed to the user—and implementation—the code used to generate that information.

The benefit of de-coupling these two aspects of application development is that it allows for changes to be made to one aspect without requiring changes to the other. In other words, the way data is displayed (font selection, color scheme, page layout, etc.) can be revised without modification to the Java code. This de-coupling also provides flexibility in changing the underlying implementation as long as standard component interfaces are provided to the JavaServer Pages.

As a result of this de-coupling of presentation and implementation, a clear division of labor can be achieved in the development and maintenance of dynamic web applications. The use of a common page data model and a tag library for mapping this data to web pages standardizes the development process for each web page built upon the architecture.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A computer readable storage media comprising computer readable instructions for providing client services, the computer readable instructions comprising instructions for:
   providing a multi-tiered E-platform architecture including:
   a user interface;
   a presentation tier coupled to the user interface, wherein a user that is one of a member, a member service representative, a customer, a customer representative, an agent and a vendor, communicates with the presentation tier through a communication channel that is one of a computer, a PDA device, a web enabled phone device, a business to business communication and a telephone device, whereby the presentation tier controls a page data structure providing a generalized view of data for a page supplemented by metadata for field labels, domain lists, edit rule definitions, and help content and wherein the presentation tier includes a rules-based page flow mechanism for controlling the flow of pages within a particular presentation task;
   a presentation services framework in the presentation tier;
   an integration tier coupled to the presentation tier;
   an application services framework and a connectivity services framework in the integration tier, wherein the application services framework functions as a mediation between the presentation services framework and the connectivity services framework;
   a business tier coupled to the integration tier; and
   a data tier coupled to the business tier;
   providing a distributed Internet application (DIA) linked to the presentation tier, the integration tier and the business tier;
   coupling an application service to the presentation tier to determine task sequencing for updating and verifying data to be acquired from a database according to a plurality of tasks such that all of the plurality of tasks may be completed, verified, and error free in order to build a page data model from the data in the presentation tier;
   providing a plurality of business units of a provider of the DIA in the business tier, wherein each business unit provides at least one of products and services for a user of the DIA, the business units being accessible through the integration tier, whereby the data tier accesses data from any of the business units designated by a user of the DIA and the presentation tier manages user interactions and communicates results of the user interactions to the business tier;
   providing a data storage for each business unit, wherein the data storage relates to a specific user of the DIA;
   providing an access code for accessing the data storage;
   providing a user profile portion in the presentation tier;
   providing an environment profile portion in the presentation tier;
   providing a field edit services portion in the presentation tier;
   providing a message display portion in the presentation tier;
   providing a page data model;
   updating the page data model via a plurality of web pages, wherein the updating is accomplished by responding through a Java Server page using a custom tag to extract data from the page data model;
   providing a controller portion including a presentation controller and an application servlet;
   providing a dynamic section generator portion in the presentation tier, wherein the dynamic section generator generates an HTML code for the Java Server page automatically based on data in the page data model;
   providing a dynamic section template to tailor a presentation of the dynamic section generator;
   providing an application service manager;
   controlling a task order in which data passes from the integration tier to the presentation tier; and
   providing a connectivity layer for continuously translating data passing between the data tier and the presentation tier.

2. A system for providing client services with the assistance of a single source comprising:

providing a multi-tiered E-platform architecture including:
  a user interface;
  a presentation tier coupled to the user interface, wherein a user that is one of a member, a member service representative, a customer, a customer representative, an agent and a vendor, communicates with the presentation tier through a communication channel that is one of a computer, a PDA device, a web enabled phone device, a business to business communication and a telephone device, whereby the presentation tier controls a page data structure providing a generalized view of data for a page supplemented by metadata for field labels, domain lists, edit rule definitions, and help content and wherein the presentation tier includes a rules-based page flow mechanism for controlling the flow of pages within a particular presentation task;
  a presentation services framework in the presentation tier;
  an integration tier coupled to the presentation tier;
  an application services framework and a connectivity services framework in the integration tier, wherein the application services framework functions as a mediation between the presentation services framework and the connectivity services framework;
  a business tier coupled to the integration tier; and
  a data tier coupled to the business tier;
providing a distributed Internet application (DIA) linked to the presentation tier, the integration tier and the business tier;
coupling an application service to the presentation tier to determine task sequencing for updating and verifying data to be acquired from a database according to a plurality of tasks such that all of the plurality of tasks may be completed, verified, and error free in order to build a page data model from the data in the presentation tier;
providing a plurality of business units of a provider of the DIA in the business tier, wherein each business unit provides at least one of products and services for a user of the DIA, the business units being accessible through the integration tier, whereby the data tier accesses data from any of the business units designated by a user of the DIA and the presentation tier manages user interactions and communicates results of the user interactions to the business tier;
providing a data storage for each business unit, wherein the data storage relates to a specific user of the DIA;
providing an access code for accessing the data storage;
providing a user profile portion in the presentation tier;
providing an environment profile portion in the presentation tier;
providing a field edit services portion in the presentation tier;
providing a message display portion in the presentation tier;
providing a page data model;
updating the page data model via a plurality of web pages, wherein the updating is accomplished by responding through a Java Server page using a custom tag to extract data from the page data model;
providing a controller portion including a presentation controller and an application servlet;
providing a dynamic section generator portion in the presentation tier, wherein the dynamic section generator generates an HTML code for the Java Server page automatically based on data in the page data model;
providing a dynamic section template to tailor a presentation of the dynamic section generator;
providing an application service manager;
controlling a task order in which data passes from the integration tier to the presentation tier; and
providing a connectivity layer for continuously translating data passing between the data tier and the presentation tier.

3. A method of providing client services comprising:
providing a multi-tiered E-platform architecture including:
  a user interface;
  a presentation tier coupled to the user interface, wherein a user that is one of a member, a member service representative, a customer, a customer representative, an agent and a vendor, communicates with the presentation tier through a communication channel that is one of a computer, a PDA device, a web enabled phone device, a business to business communication and a telephone device, whereby the presentation tier controls a page data structure providing a generalized view of data for a page supplemented by metadata for field labels, domain lists, edit rule definitions, and help content and wherein the presentation tier includes a rules-based page flow mechanism for controlling the flow of pages within a particular presentation task;
  a presentation services framework in the presentation tier;
  an integration tier coupled to the presentation tier;
  an application services framework and a connectivity services framework in the integration tier, wherein the application services framework functions as a mediation between the presentation services framework and the connectivity services framework;
  a business tier coupled to the integration tier; and
  a data tier coupled to the business tier;
providing a distributed Internet application (DIA) linked to the presentation tier, the integration tier and the business tier;
coupling an application service to the presentation tier to determine task sequencing for updating and verifying data to be acquired from a database according to a plurality of tasks such that all of the plurality of tasks may be completed, verified, and error free in order to build a page data model from the data in the presentation tier;
providing a plurality of business units of a provider of the DIA in the business tier, wherein each business unit provides at least one of products and services for a user of the DIA, the business units being accessible through the integration tier, whereby the data tier accesses data from any of the business units designated by a user of the DIA and the presentation tier manages user interactions and communicates results of the user interactions to the business tier;
providing a data storage for each business unit, wherein the data storage relates to a specific user of the DIA;
providing an access code for accessing the data storage;
providing a user profile portion in the presentation tier;
providing an environment profile portion in the presentation tier;

providing a field edit services portion in the presentation tier;

providing a message display portion in the presentation tier;

providing a page data model;

updating the page data model via a plurality of web pages, wherein the updating is accomplished by responding through a Java Server page using a custom tag to extract data from the page data model;

providing a controller portion including a presentation controller and an application servlet;

providing a dynamic section generator portion in the presentation tier, wherein the dynamic section generator generates an HTML code for the Java Server page automatically based on data in the page data model;

providing a dynamic section template to tailor a presentation of the dynamic section generator;

providing an application service manager;

controlling a task order in which data passes from the integration tier to the presentation tier; and providing a connectivity layer for continuously translating data passing between the data tier and the presentation tier.

* * * * *